Feb. 21, 1928.
F. A. VALENTINE
COUNTERWEIGHT DEVICE
Filed Feb. 8, 1927          2 Sheets-Sheet 2
1,659,675
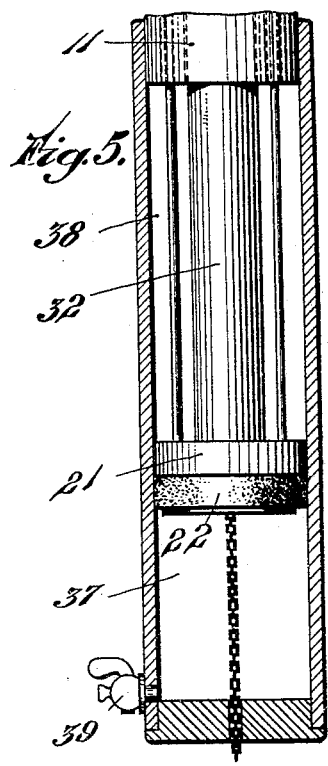
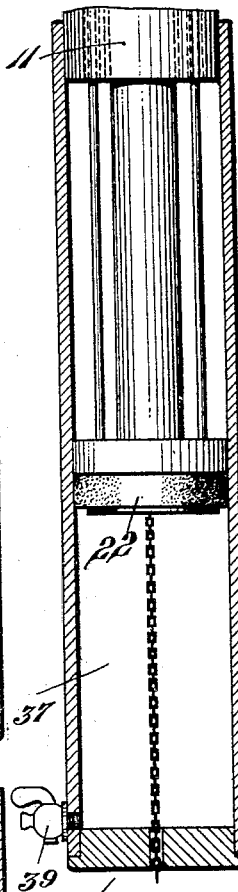
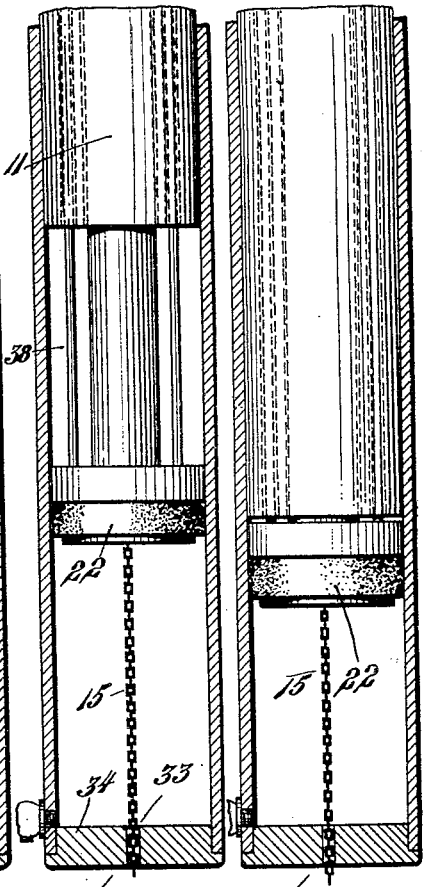
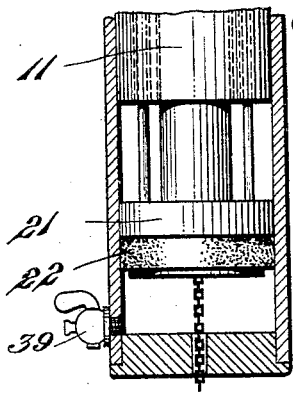
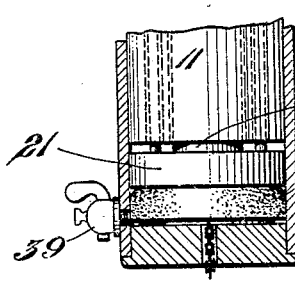
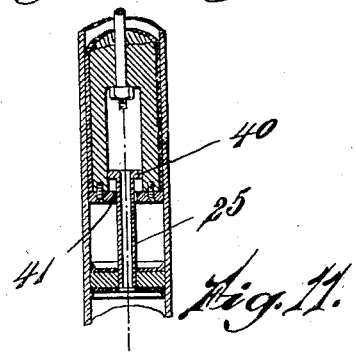
INVENTOR.
Frank A. Valentine.
BY Barlow & Barlow
ATTORNEYS.

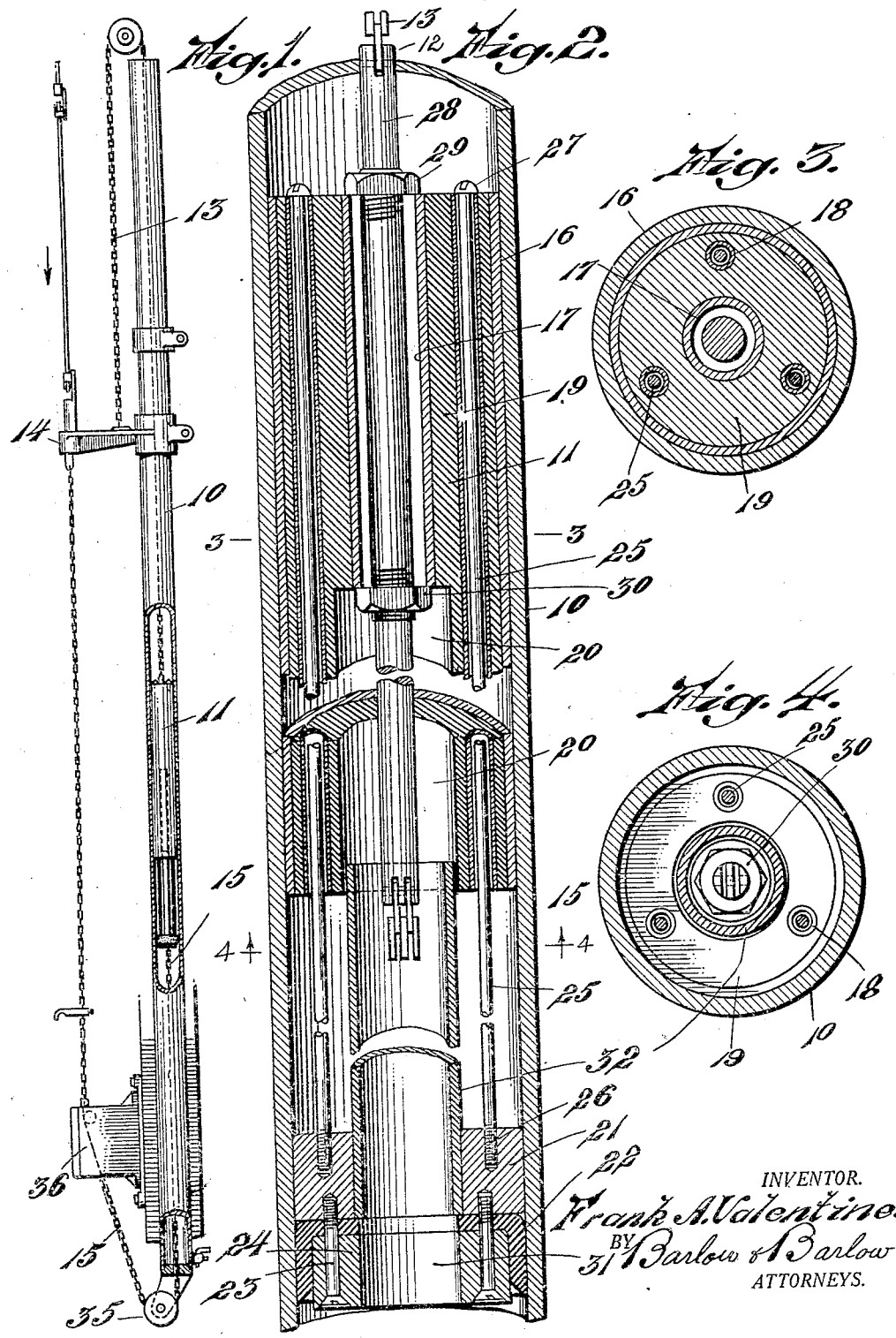

Patented Feb. 21, 1928.

1,659,675

UNITED STATES PATENT OFFICE.

FRANK A. VALENTINE, OF APPONAUG, RHODE ISLAND, ASSIGNOR TO HENRY L. SCOTT COMPANY, OF PROVIDENCE, RHODE ISLAND, A CORPORATION OF RHODE ISLAND.

COUNTERWEIGHT DEVICE.

Application filed February 8, 1927. Serial No. 166,686.

This invention relates to an improved construction of a counterweight device; and has for its object to provide such a device more particularly adapted for use on machines for testing the strength and stretch of materials such as fabric, rubber or other materials but which weight device may be employed for any purpose for which it is adapted.

A further object of the invention is to construct the weight of a plurality of separable sections mounted to slide in a cylinder, the sections being arranged to be lifted successively to form cushioning chambers in the cylinder one beneath the weight and another between the weight sections to provide a dashpot effect and to control the dropping speed of these weight sections.

A still further object of the invention is to form the weight with a main body section to which the chain or power applying member is attached and to form a cushioning socket in this body portion also to provide a lower weight section which is separably connected to the body section and is suspended a predetermined distance from the body section when the latter is lifted, the lower section having an opening through it and also having a hollow plunger loosely fitting the socket of the body section through which opening and hollow plunger the lifting chain extends to be attached to the body section, by this construction a lifting action on the body section first forms a cushioning space between the sections and the subsequent lifting of the lower section to form a cushioning chamber between it and the end of the cylinder whereby the weight is released to drop the lower section is cushioned in the lower chamber and the upper section is cushioned in the chamber formed between the separated sections.

With these and other objects in view, the invention consists of certain novel features of construction, as will be more fully described, and particularly pointed out in the appended claims.

In the accompanying drawings:

Figure 1 is a side elevation partly in section illustrating my improved counterweight as applied to a testing machine, the weight being mounted to slide in the tubular standard.

Figure 2 is a sectional elevation showing parts of the weight as broken and mounted in the cylindrical standard.

Figure 3 is a section on line 3—3 of Figure 2.

Figure 4 is a section on line 4—4 of Figure 2.

Figure 5 illustrates the relative positions of the main body weight section and the lower weight section during its falling action as the lower section approaches the lower end of the cylinder.

Figure 6 shows the upper section as having gained on the lower section, the lower section being somewhat cushioned in the lower chamber and the upper section being cushioned between the upper and lower weight sections.

Figure 7 shows the lower section as having reached and as resting upon the cylinder closure member and the upper section as having entirely dropped into engagement with the lower section, the air in the space between them serving as a cushion and prevent them from coming together with shock or jar.

Figure 8 illustrates the lower weight section as having dropped a certain distance and as being cushioned upon the air trapped in the lower chamber.

Figure 9 shows the lower weight section as having traveled a short distance and the upper weight section as having traveled a considerably greater distance being cushioned in its chamber between two sections.

Figure 10 illustrates the lower section as having been cushioned and practically stopped on the air pressure trapped in the lower cushion chamber, the upper weight section as having closely approached the lower section having been cushioned on the air in the chamber between the weight sections.

Figure 11 is a modification showing the lower weight section as suspended on its central plunger from the upper section.

It is found in the practical operation of counterweights of this particular type when applied to testing machines of this character, of advantage to provide a weight which when permitted to fall for the purpose of returning the working parts of its attached mechanism to their starting position, will be cushioned in its cylinder so as not to shock or jar the adjacent parts; also it is found often desirable in the operation of machines of this character to return the working parts to different starting positions. Therefore where the weight is connected in a continuous chain or connector as in the testing machine herein illustrated, it is sometimes caused to be stopped with a cushioning effect before it reaches the bottom of the cylinder in which it slides, and to accomplish this cushioning effect, I have formed the weight in a plurality of sections, the lower section being loosely suspended from the upper section so that when the weight is lifted the upper section will rise first and after being lifted a predetermined distance the lower section or sections suspended therefrom will then be lifted therefrom forming a cushioning space between them so that when the weight is permitted to fall the lower section will be first cushioned in the chamber between it and the lower end of the cylinder and the upper section or sections will each be cushioned in the chamber between it and the next lower section thereby bringing the parts gently to rest without jar or shock; and the following is a detailed description of the present embodiment of my invention and showing one construction of counterweight and arrangement of parts by which these advantageous results may be accomplished:

With reference to the drawings, 10 designates the tubular standard of a testing machine in which is mounted the counterweight 11 to slide axially therein, the upper end of the main weight section 12 being connected through a chain 13 to the clamp carrying head 14, while the lower end of this main weight section is connected through a chain 15 to the under side of the head 14 thereby forming a continuous chain or band through the weight. This main weight section is formed essentially of an outer tubing 16, the inner central tubular core 17 and a plurality of smaller tubings 18 located in different desired positions in the body of the weight and then a lead filling 19 is poured or molded into this outer tubing 16 and about the smaller tubes 17 and 18. The bottom portion of this main body being recessed to form a chamber or socket 20 for the purpose presently described.

The lower weight section 21 is formed of a metal disc having a leather packing 22 secured to its lower end the packing being retained in position by means of bolts 23 extending through the washer 24 and threaded into the disc 21. This lower weight section 21 is arranged to be suspended from the main weight section 11 by means of three long rods 25, the lower ends of which are threaded as at 26 into the disc 21, the rods being of a length considerably greater than that of the upper weight section 11 and are provided with heads 27 arranged to engage the upper end of the tubes 18 so that when the main weight section is lifted a predetermined distance these heads 27 of the rods will be engaged by the upper weight to lift the lower section after forming a cushion chamber in space between.

In order to secure the operating chain to this upper weight section, I have positioned a rod 28 to extend through the central tube 17 and secure the rod therein by means of the upper and lower nuts 29 and 30, the chain 13 being secured to the upper end of this rod while the chain 14 is secured to the lower end thereof.

In order to control the opening through the lower weight disc 21 through which the lower chain portion 15 is passed, I have formed a hole 31 through the washer 24 also a hole through the disc 21 and in this disc I have positioned a length of tubing 32 which extends up and fits loosely in the socket 20 in the upper weight body and I have also formed a small hole 33 in the cylinder closure member 34 whereby the chain 15 which is connected to the lower end of the rod 28 may be extended down through the tube 32 and through the opening 33 in the closure member nearly filling this opening and be led down around the pulley 35 and up through the power applying mechanism (not shown) in the casing 36, thence up to the under side of the head 14.

By this construction, it will be seen that when the weight is released by the power mechanism to drop the lower weight section 21 is first to fall the cushioning effect of the lower chamber 37 as it approaches the lower end of the cylinder during which time the upper weight which is heavier gains upon the lower weight section closing up the cushioning space 38 between them thereby first gradually arresting the lower section on its lower cushion 37 and then the upper section on its cushion in chamber 38 between the two sections.

In order to control the velocity of the drop of the lower section as it approaches the lower end of its cylinder I may if desired insert an air vent cock 39 which may be opened to release the air in this lower cushion chamber as desired to control the velocity or cushioning effect of the final drop of the lower section. The air in the upper chamber 38 is permitted to escape through the tubes 18 about the rods 25 with just sufficient velocity to cause the upper section to cushion nicely upon the lower section. Also in some instances, it is found of advantage instead of providing a vent cock 39 to form a plunger 32 of a size to fit quite loosely in its socket 20 and so permit a portion of the air from the lower cushion chamber to pass up through this tube and down between its walls and those of the socket and then out through the tubes 18.

In some instances where it is desired to cushion the weight before it reaches the bottom of its cylinder I may if desired partially close the vent opening through the vent cock 39 and so trap the large portion of the air in the lower chamber 37. In this way, as illustrated in Figures 8, 9, and 10 when the lower weight section has dropped sufficiently, it traps the air in the lower chamber 37 and then moves quite slowly giving the upper weight a chance to approach and as this lower weight is cushioned on the air in its upper chamber 38 the whole comes to rest without shock or jar in the position best illustrated in Figure 10.

In this way the weight may be cushioned at any desired point in its cylinder without being obliged to drop the whole length thereof, in order to obtain such cushioning effect.

In some instances, the rods 25 fit their tubes 18 sufficiently close to provide an insufficient air vent for the upper chamber and in this case some of the cushioning pressure is caused to pass up around the plunger through the socket and it will be noted that in this event the nearer the upper weight is to the lower weight the greater distance the plunger extends into its socket and consequently the greater is the frictional resistance offered to the escaping air pressure in order to pass the plunger on its way out thus increasing the effectiveness of this cushion as the weight approaches the end of its stroke, which is, of course, the effect desired. Also in some instances an enlargement 40 may be provided on the plunger 25 to engage a shoulder 41 in the socket of the body section by means of which the lower section may be suspended, as illustrated in Figure 11.

My improved counterweight device is very simple and practical in construction and is effective in its operation and by its use its weight may cushion partly on the air below and partly on the air between the two weight sections.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A counterweight comprising a cylinder, a weight formed of a plurality of connected separable sections mounted to slide in said cylinder, said sections being arranged to be lifted and separated successively to form cushioning chambers in the cylinder beneath the weight and between the weight section to control the drop of said sections.

2. A counterweight comprising a cylinder, a weight formed of a plurality of connected separable sections mounted to slide in said cylinder, said sections being arranged to be lifted and separated successively to form cushioning chambers in the cylinder beneath the weight and between the weight sections, said chambers being vented to control the dropping speed of the weight sections as they approach the end of their stroke.

3. In a counterweight device, a cylinder having a closure member at one end, a weight formed of a plurality of connected separable sections arranged to be moved successively and provide a cushioning chamber between them when separated and an air vent to said chamber for controlling its cushioning effect upon said sections when moved rapidly toward each other.

4. In a counterweight device, a cylinder having a closure member at one end, a weight formed in two connected separable sections slidably mounted in said cylinder and having interengaging portions, said portions and sections being arranged to be lifted and separated successively to form cushioning chambers to cushion said weight sections when moved back toward each other.

5. In a counterweight device, a cylinder having a closure at one end, a weight formed of a plurality of connected separable sections slidable in said cylinder, said sections being arranged to be lifted and separated successively and suspended in spaced relation one from the other providing cushioning chambers below the weight units and between its sections, said chambers being vented to permit the dropping of the different sections at different relative speeds.

6. In a counterweight device, a cylinder having a closure at one end, a weight formed of a plurality of connected separable sections slidable in said cylinder, said sections being arranged to be lifted and separated successively and suspended one from the other providing a cushion chamber in the cylinder below the weight units and between its separated sections, one of said sections also having a compression socket and a plunger on the next adjacent section slidable into said socket to assist in producing the desired cushioning effect on the weight sections.

7. In a counterweight device, a cylinder having a closure at one end, a weight formed of a plurality of connected separable sections slidable in said cylinder, said sections being arranged to be lifted and separated successively and suspended one from the other providing a cushion chamber in the cylinder below the weight unit and between its separated sections, one of said sections also having a compression socket and a plunger on the next adjacent section slidable in said socket to assist in producing the desired cushioning effect on the weight sections, a vent opening being formed through said plunger and socket providing vent communication between said cushioning chambers.

8. In a counterweight device, a cylinder having a closure member, a weight formed of a body section to which the operating member is attached and a lower section loosely suspended to be separated from the body section a predetermined distance when lifted both sections being slidable in said cylinder whereby a lower cushioning chamber is formed beneath the weight and an auxiliary chamber formed between said sections, said chamber being so vented as to cause said sections to drop at different relative speeds.

9. In a counterweight device, a cylinder having a closure member at one end, a weight formed of a body section to which the operating member is attached and a lower section loosely suspended to be separated from the body section a predetermined distance when lifted both sections being slidable in said cylinder whereby a lower cushioning chamber is formed beneath the weight and an auxiliary chamber formed between said sections, said chamber being vented to control the drop of said sections.

10. In a counterweight device, a cylinder having a closure member at one end, a weight formed of a body section to which the weight operating member is attached, said body having a cushion socket, a lower weight section separably connected to the body section to be separated and suspended a predetermined distance therefrom when said body section is lifted, said lower section having an opening through it and having a hollow plunger loosely fitted in said socket and through which the lower connection to the body section extends, whereby a lifting action on the body section first forms a cushioning space between the sections, the lower section being subsequently lifted to form a cooperating cushion chamber below it.

11. In a counterweight device, a cylinder having a closure member at one end, a weight formed of a body section to the upper and lower ends of which the weight operating member is attached, said body having a cushion socket, a lower weight section separably connected to the body section to be separated and suspended a predetermined distance therefrom when said body section is lifted, said lower section having an opening through it and having a hollow plunger arranged to suspend the lower from the upper section, said plunger being fitted in said socket and through which the lower connection to the body section extends, whereby a lifting action on the body section first forms a cushioning space between the sections, the lower section being subsequently lifted to form a cooperating cushion chamber below it and the space between the walls of the plunger providing an air vent for one of said chambers.

12. In a counterweight device, a cylinder having a closure member at one end, a weight formed of a body section to which the upper and lower portions of a weight operating member are attached, said body having a cushion socket, a lower weight section separably connected to the body section, a member slidable in one of said sections for suspending the lower from the upper weight sections when the two are separated a predetermined distance as said body section is lifted, said lower section having an opening through which the lower connection to the body section extends, whereby a lifting action on the body section first forms a cushioning space between the sections, the lower section being subsequently lifted to form a cooperating cushion chamber below it, and means for venting said chambers to permit the body section to fall faster than the bottom section when released to finally cushion on said lower section.

13. A counterweight comprising a cylinder, a weight formed of a plurality of connected separable sections mounted to slide in said cylinder, said sections being arranged to be lifted and separated successively to form cushioning chambers in the cylinder beneath the weight and between the weight section to control the drop of said sections, and means for suspending the lower from the upper section.

14. In a counterweight device, a cylinder having a closure at one end, a weight formed of a plurality of connected separable sections slidable in said cylinder, said sections being arranged to be lifted and separated successively and suspended in spaced relation one from the other providing cushioning chambers below the weight units and between its sections, said chambers being vented to permit the dropping of the different sections at different relative speeds, and means slidable in one section for suspending the lower section therefrom when separated.

In testimony whereof I affix my signature.

FRANK A. VALENTINE.